April 29, 1958 G. E. MARSH 2,832,866
POLARIZED RELAY
Filed Dec. 17, 1952 7 Sheets-Sheet 1

INVENTOR.
G. E. MARSH
BY
Forest B. Hitchcock
HIS ATTORNEY

April 29, 1958

G. E. MARSH 2,832,866

POLARIZED RELAY

Filed Dec. 17, 1952

INVENTOR.
G. E. MARSH
BY
*Forest B. Hitchcock*
HIS ATTORNEY

April 29, 1958 G. E. MARSH 2,832,866
POLARIZED RELAY

Filed Dec. 17, 1952 7 Sheets-Sheet 3

INVENTOR.
G. E. MARSH
BY
Forest B. Hitchock
HIS ATTORNEY

April 29, 1958   G. E. MARSH   2,832,866
POLARIZED RELAY
Filed Dec. 17, 1952   7 Sheets-Sheet 4

FIG. 8.

BIASED TO ONE POSITION

FIG. 9.

INVENTOR.
G. E. MARSH
BY Forest B. Hitlink
HIS ATTORNEY

April 29, 1958 G. E. MARSH 2,832,866
POLARIZED RELAY
Filed Dec. 17, 1952 7 Sheets-Sheet 5

INVENTOR.
G. E. MARSH
BY Forest B. Hitchcock
HIS ATTORNEY

April 29, 1958 G. E. MARSH 2,832,866
POLARIZED RELAY
Filed Dec. 17, 1952 7 Sheets-Sheet 6

INVENTOR.
G. E. MARSH
BY *Forest B. Hitchcock*
HIS ATTORNEY

FIG. 17. DIAGRAM OF OPERATION WHEN ARMATURE IS BIASED TO ONE POSITION

DIAGRAM OF OPERATION WHEN ARMATURE IS NOT BIASED (TWO POSITION TYPE)

FIG. 18.

United States Patent Office 2,832,866
Patented Apr. 29, 1958

2,832,866
POLARIZED RELAY

Gareld E. Marsh, Irondequoit, N. Y., assignor to General Railway Signal Company, Rochester, N. Y.

Application December 17, 1952, Serial No. 326,564

17 Claims. (Cl. 200—93)

This invention relates in general to electromagnetic relays, and more particularly pertains to relays of the polarized type.

The relay structure of the present invention is contemplated as being particularly adaptable for a code following relay since it is proposed to construct its armature in such a way that it will have a relatively small mass and yet be stable in structure so as to readily follow fast codes.

A still further object of the invention is to provide a structure of this type which is rigid and stable so as to withstand the vibration incident to continuous code operation without adversely affecting the relay adjustment.

Another object of the invention is to provide a support for the relay armature in such a way as to avoid the loss of energy due to friction, and to eliminate the wear usually present in conventional trunnion type bearings.

Another object of the invention is to provide a relay structure of the polarized type which is readily converted from a two-position "stay-where-put" type of relay to a relay of the biased to one position type. In the first mentioned type, the armature is operated to one position by one polarity of energization, and to the opposite position by the opposite polarity of energization. In the second type, the armature is biased to one position and is operated to its opposite position only by a particular polarity of energization.

A still further object of the invention is to provide a relay structure in which two independently operable armatures may be used, one of which is responsive to one polarity of energization and the other of which is responsive to the opposite polarity of energization; but with the structure so organized that both armatures are polarized by the same permanent magnet and actuated by the energization of the windings on the same core structure.

A further feature of the present invention is to provide non-wearing and non-warping backstops for the armature, which backstops absorb the shock of its operation and which also act to prevent intimate contact of the armature with its core structure to avoid the adverse effects of residual magnetism.

An additional feature of the present invention is the provision of contacts of the non-bounce type which are constructed to give a two-step build up of the contact pressures in a way to minimize armature rebound by absorbing kinetic energy from the armature.

Generally speaking, and without any attempt to define the exact nature and scope of the invention, it is proposed to provide a relay structure which has its armature pivoted on spring mountings located substantially at right angles to each other so as to maintain the central axis or pivot point of the armature at a given point within the tolerances of the usual bushing or pinion type bearing. It is also proposed in one form of the relay that this spring mounting be employed to provide the initial set of the armature in an off-center position such that the presence of magnetic flux from a permanent magnet will cause the armature to be biased to a particular position. This mechanical spring bias and magnetic bias from the permanent magnet are so balanced as to materially improve the operating characteristics of the relay.

Further objects, purposes and characteristic features of this invention will appear as the description progresses, reference being made to the accompanying drawings solely by way of example and in no way in a limiting sense to different forms which the invention can assume.

In the drawings:

Fig. 6 is an isometric view of the relay structure shown in Figs. 1, 2 and 3 with certain parts removed to illustrate more clearly the armature mounting and the structural formation of the supports for the back stops, permanent magnet and the like;

Figure 1:
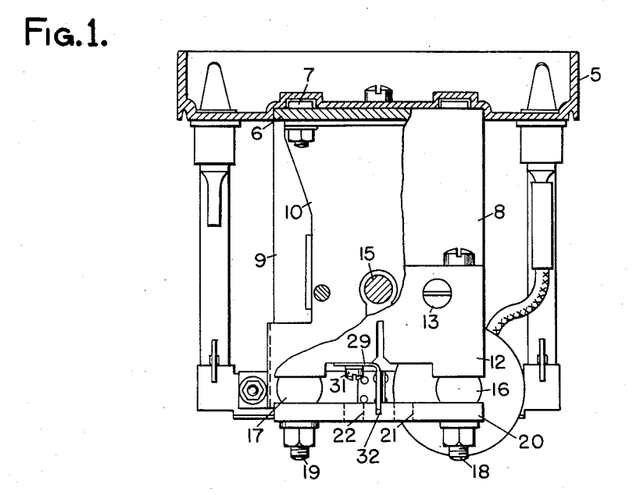
Fig. 1 is a top view of one form of relay structure embodying the present invention to give a relay of the two-position polar type.
Figure 2:
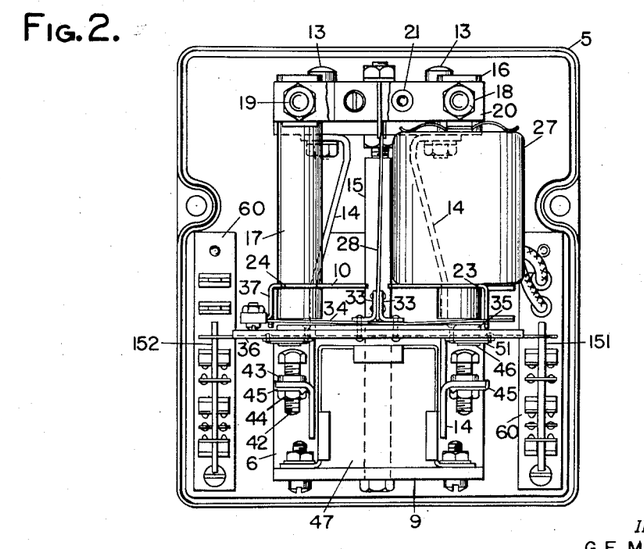
Fig. 2 is a front view of the relay shown in Fig. 1.
Figures 3, 4:
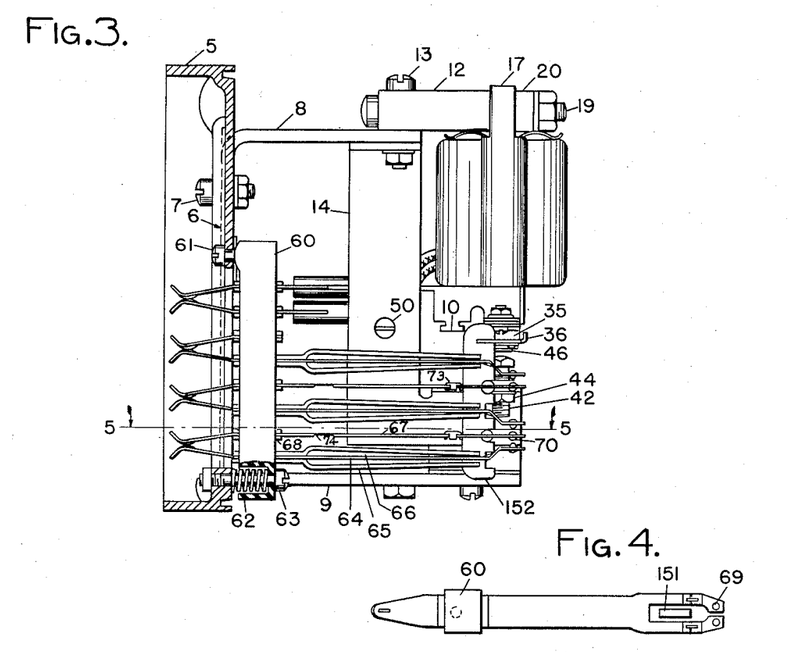
Fig. 3 is a side view of the relay shown in Figs. 1 and 2 with certain parts shown in section.
Fig. 4 is a top view of one of the contact components.

Referring to Figs. 1, 2 and 3, it will be seen that one form of the relay of the present invention is provided with a back plate or base 5 which has a generally flat face to which the various parts of the relay are attached. This base plate 5 is preferably die cast of some suitable metal with upturned sides and ends to provide a continuous edge to give rigidity to such base plate 5 and to enclose the plug coupling connectors when the relay is mounted against a plugboard. To this base plate 5 is mounted a supporting bracket 6 which fits in a slightly depressed section (see Fig. 3) and is attached to the base plate by bolts 7 at several different points. The shape of this support bracket 6 can best be seen in Fig. 6 where the isometric view clearly indicates that this support bracket has two outwardly turned ends 8 and 9. Between these two outwardly turned ends 8 and 9 is an intermediate bracket 10 which is connected to the support bracket 6 by bolts 11 (see Fig. 6).

Figure 6:
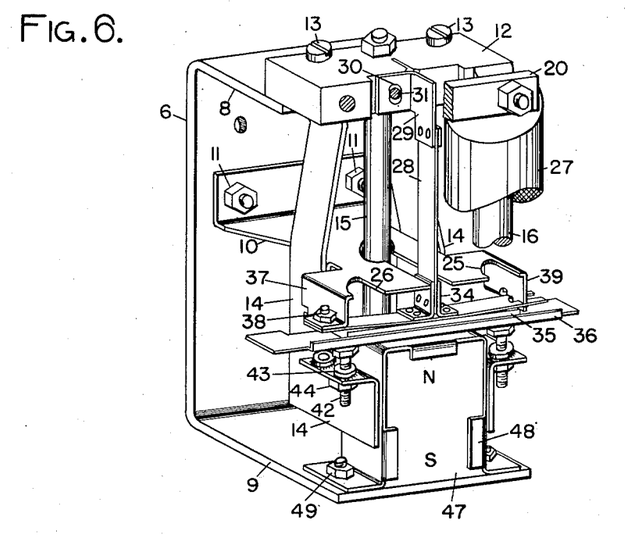

Connected to the upper extending portion 8 of the support bracket 6 is a core block 12. This core block 12 is held in place by bolts 13 which also hold in position two downwardly and oppositely disposed brackets 14 (see Figs. 2 and 6). These brackets 14 are attached to the intermediate bracket 10 by bolts 50 which pass through the down turned ears of bracket 10 (see Figs. 3 and 7). It will be noted that a stabilizing bolt 15 is attached to both the extending portion 8 of the support bracket 6 and the extending portion 9 of the support bracket 6 and affords a means of adjusting the air gap between the permanent magnet and the armature. At the upper end, this bolt 15 passes through the block 12 as can be seen in both Figs. 2 and 3. This bolt passes through a hole in bracket 10 as can be seen in Figs. 1 and 6.

The core block 12 has two downwardly extending cores 16 and 17 attached to it by bolts 18 and 19 which hold in position a backstrap 20. This backstrap 20 also has holes at 21 and 22 to allow access to the stud bolts which fasten the armature support springs as will be described in greater detail later.

The downwardly extending cores 16 and 17 have slots 23 and 24 near their lower ends as can be seen in Fig. 2, which slots allow the cores to snugly fit into recesses 25 and 26 in the intermediate bracket 10. This provides stability for the ends of the cores and also adds a rigid holding effect on the bracket member 10 since its thickness is just proper to fit into the slots 23 and 24 with a mild press fit.

Mounted between the two cores 16 and 17 is a spring 28 which is anchored to the core block 12 at its upper end by attachment to a bracket 29. This is an L-shaped bracket 29 having a slotted hole 30 (see Fig. 6) so that the bracket 29 may be adjustably located while the screw 31 is loosened, but is firmly held in position when this screw 31 is tightened. It will be noted that the L-shaped bracket 29 extends outwardly toward the backstrap 20 to be received by a slot 32 in the backstrap (see Fig. 1). This is a tight fit, but is sufficiently loose to allow a vertical movement of the bracket 29 when the screw 31 is loosened. As previously mentioned, the hole 22 in the backstrap 20 allows access to the screw 31 to obtain this adjustment.

At the lower end of the spring 28 are attached two L-shaped brackets 33 by suitable rivets or otherwise; and the lower legs of these brackets 33 are attached to a lateral spring 34 by suitable rivets or otherwise, which rivets pass through the armature 35 and a contact operating member 36 (see Figs. 2 and 6). One outer end of the spring 34 is attached to a downwardly extending arm 37 of the bracket 10 by a suitable bolt 38. The other end of the spring 34 is also held by a downwardly extending arm 39 of the bracket 10, but in this instance the end of the spring is bifurcated with its two fingers 40 passing through slots 41 in the arm 39. This can best be seen by reference to the enlarged isometric view of Fig. 7 where the spring 34 is clearly shown as having two fingers 40 which extend through the slots 41 of the arm 39. It will be noted from Figs. 2 and 6 that the spring 34 is slightly bowed to a predetermined arc selected for minimum fibre stress consistent with minimum lateral movement by its permanent anchorage at the left-hand side and its slideable attachment at its right-hand end.

Figure 7:
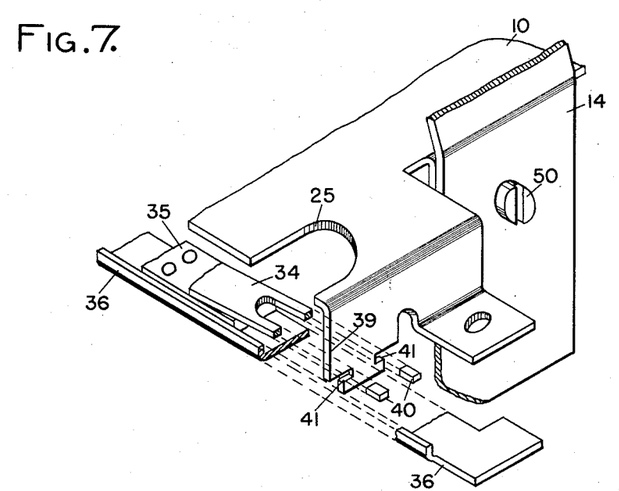
Fig. 7 is an isometric enlarged view of one portion of the armature mounting.

It can be seen from Figs. 3, 6 and 7 that the contact operating member 36 has one side upturned to provide an edge giving rigidity to such member.

The downwardly extending brackets 14 have arms which extend underneath the armature (see Fig. 3), and which are outwardly turned to mount backstops (see Figs. 2 and 6). These backstops include screws 42 which pass through the extending arms of the brackets 14 and into a threaded bushing 43 permanently attached to the arms. A lock nut 44 is used to hold the backstop screws 42 in position and in addition a locking washer 45 with upturned sides is used to complete the locking of the backstop screw. Underneath the contact operating member 36 and opposite the backstop screws 42 are phenolic resin product (such as Formica) buttons 46 held in their positions by metal shells 51 riveted to the member 36 as indicated in Fig. 2. The metal shells 51 have circular openings of sufficient size to receive the buttons 46 and allow for slight lateral expansion of the buttons without warpage; but the shells are only of sufficient thickness to correspond with the base of the buttons, so as to hold them firmly against the member 36. These phenolic plates or Formica buttons 46 must have their original molded outside surfaces unmarred, since under such condition they will withstand making contact with the backstop screws 42 for indefinite periods. In this connection, it should be noted that each backstop screw 42 is preferably of stainless steel with its head having a relatively large radius, such as in the order of one inch.

Between the lower extremities of the two downwardly extending arms or brackets 14 is mounted a permanent magnet 47, preferably of the so-called Alnico type which are made of alloys including iron, nickel and aluminum and some also including cobalt, since such permanent magnets have a higher coercive force. The permanent magnet 47 is held in position by a nonmagnetic band 48 which is connected to the extending portion 9 of the support bracket by bolts 49. As can be seen in Fig. 6 this band 48 has inwardly turned ears both on the front and on the back to hold the permanent magnet 47 in position.

It should also be noted that the downwardly extending brackets 14 are fastened to the bracket 10 as can be seen in Fig. 7 by bolts 50 to thereby prevent horizontal movement of the brackets 14 at their lower ends. This maintains the backstop screws 42 in permanent positions.

Referring to Fig. 2, it will be seen that the contact operating member 36 extends outwardly to engage the contact pusher members 151 and 152 one on each side of the relay. These contact pushers operate the movable contacts of each contact group between suitable front and back points.

In Fig. 3, it can be seen that each contact group is mounted in a molded Bakelite block 60. The block 60 has a rounded protusion at its upper end so as to be swingable upon the base 5 against which it is held by screw 61. The lower end of block 60 is provided with a recess for a spring 62 the tension of which is determined by the bolt 63 to give the general adjustment of the contacts with respect to the contact operating member 36.

The contact fingers 64 are mounted between their respective stop members 65 and 66 by being molded in position in the block 60. Between each pair of front and back contacts a movable contact finger 67 is located with one end anchored in the block 60 between two metal pieces 68.

The front and back contact fingers 64 are slotted as best seen in Fig. 4 with their free ends bifurcated. Each of the bifurcations has a spherical contact button 69 mounted thereon. The pusher member 151 passes through the slot with sufficient clearance to ensure that it does not make contact with the contact fingers 64 or the contact support members 65 and 66. Each bifurcated portion of the finger is bent downwardly (or upwardly as the case may be) as best seen in Fig. 3 to more readily cooperate with the movable contact finger 67 which also carries two spherical contact buttons 70. It will be noted from Fig. 4 that the contact supports or stops 65 and 66 are also bifurcated at their ends to allow the free passage of the contact pusher member 51.

Figure 5:
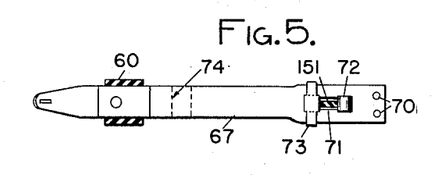
Fig. 5 is a top view of one of the movable contact fingers with its mounting and pusher assembly shown in section as taken on lines 5—5 of Fig. 3.

Fig. 5 is a sectional view taken on line 5—5 of Fig. 3 to show the movable contact 67. Each movable contact 67 has a slot 71 for receiving the contact pusher 151 and this slot is so arranged as to allow the pusher member to be moved to the right as seen in Fig. 3 to surround a slotted roller 72 which is fitted over the movable contact. In this position, the movable contact finger 67 must move up and down as the contact pusher 151 is operated but with a roller bearing effect. The pusher 151 and roller 72 are held in its position by reason of a strap member 73 which has downwardly extending prongs as seen in Fig. 3 to fit in the unused portion of the slot 71 and with its outer ends bent down and underneath its movable contact 67. In this way, each movable contact finger is attached with a roller bearing effect to the contact pusher member 151. In order to make these movable contact fingers 67 more freely operate, a portion 74 of each finger is reduced in cross section to give what might be termed a hinging effect.

It will also be noted by referring to Figs. 4 and 5 that each fixed and movable contact is provided with a hole which is inside of the molded block 60 to receive some of the Bakelite and thus more firmly anchor such fingers. The fingers also extend outwardly as viewed in Fig. 3 to provide contacts for a plug coupling connection. At the upper end of each block are two contact fingers for the plug coupling connection which terminate in stubs suitable to have slip-on connections made thereto for the winding terminals.

In both Figs. 2 and 3, the armature 35 is shown in a mid position for convenience in the illustration and for this reason the movable contact fingers 67 are likewise in a mid position, i. e. not making contact with either front or back contact fingers. The positions normally assumed by the armature will be discussed later.

The front and back contact fingers are tensioned against their respective stops 66 with a predetermined trapped pressure. The stop 65 is so positioned that when the contact pusher member 151 moves downwardly to a fully operated position, the movable contact finger 67 with its points 70 first picks up the initial trapped pressure of contact 64, and then moves the bifurcated fingers of the contact 64 through a short distance before coming against the stop 65, and that the final movement of the movable contact finger 67 creates an added tension against the contact 64 due to the deflection rate of backstop 65. In other words, after the picking up of the initial trapped pressure the contact finger 64 is moved through a short space between the ends of the stops 65 and 66 to constitute a primary deflection; while the final movement of the movable contact finger 67 pushes the contact finger 64 against stop 65 through a secondary deflection. This causes the load on the armature to vary in a manner illustrated in Figs. 17 and 18 to provide a shock absorbing non-bounce contact finger organization. The effect of this is to slow down the armature in its travel to its new position so as to reduce the impact with which it strikes its backstop.

Contacts provided with this two step feature have been disclosed in my prior Patent No. 2,731,527, issued January 17, 1956, with a different form of contact structure. For this reason, broad claims to this subject matter are included in my prior application; while claims specific to this form of contact disclosed herein are included in this application.

The structure of the relay of Figs. 1, 2 and 3 may be employed either for a relay of the two-position polarized type, or a relay of a "biased to one-position" type, as above mentioned. When the armature supporting spring 28 is arranged to provide a centering effect for the armature as shown in Fig. 2, then the structure is suitable for a two-position polarized type of relay. This is because, addition of the permanent magnet 47 provides a biasing magnetic flux for each position of the relay armature 35. It is impossible from a practical standpoint to so balance the magnetic fluxes of the two possible paths for flux from the permanent magnet that the armature will remain in a center position, but rather the armature will move one way or the other, and the further it moves the greater the magnetic attraction in the same direction. Then, the energization of the windings on the core will produce an effect for operation of the armature 35 to one position or the other depending upon the polarity of such energization. The armature remains in either operated position regardless of the deenergization of the windings, since the magnetic flux from the permanent magnet is sufficient for this purpose.

Figure 9:
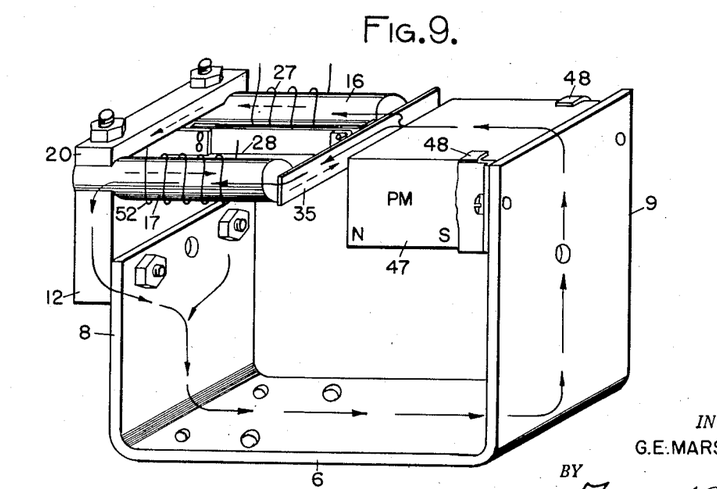
Fig. 9 is an isometric diagrammatic view of the relay structure of Figs. 1, 2 and 3 to more readily illustrate the magnetic flux paths involved and the operation of the relay.

With the relay structure of Figs. 1, 2 and 3 taking this form, the relay is preferably provided with two windings 27 and 52, one for each of the two cores 16 and 17 as indicated in Fig. 9, it being understood that Figs. 1, 2 and 3 show only the winding 27 merely for convenience in the illustration. Referring to Fig. 9, it will be noted that the flux from the permanent magnet 47 takes two paths through the armature 35, through the respective cores 16 and 17, core block 12, bracket portions 8, 6 and 9 to the opposite pole of the permanent magnet 47. When the armature 35 is in such a position that its left-hand end is close to the face of the core 17 then the most of the permanent magnet flux passes through this core 17 rather than the core 16 where the air gap between the armature 35 and its core face is the greatest. This permanent magnet flux is of sufficient magnitude to hold the armature 35 and its associated contacts in a corresponding operated position without energization of the windings. On the other hand, when the armature 35 is in such a position that its right-hand end is closer to the face of core 16 than the left-hand end is to the face of core 17, then most of the permanent magnet flux passes through core 16 and causes the armature 35 and its associated contacts to assume a corresponding operated position.

Let us assume that the armature 35 is in its operated position closest to the face of core 17, and that the windings 27 and 52 on the two cores 16 and 17 are energized to produce a magnetic flux indicated by the dotted arrows. The net flux in core 17 is reduced to a relatively low value while the net flux in core 16 is increased to an operating value. This is because the two fluxes oppose each other in core 17, whereas, they are additive in core 16.

When the armature 35 assumes its new position, it is apparent that the air gap between it and the face of the core 16 is at a minimum and the armature is held in that position by flux from the permanent magnet even though the windings are deenergized.

If the windings 27 and 52 are energized with the opposite polarity, then the magnetomotive force of the windings take a direction opposite to the dotted arrows in Fig. 9 so that the net flux in core 16 is reduced while the net flux in core 17 is increased. This operates the armature 35 to its former position in which it is held by the flux of the permanent magnet.

Figure 18:
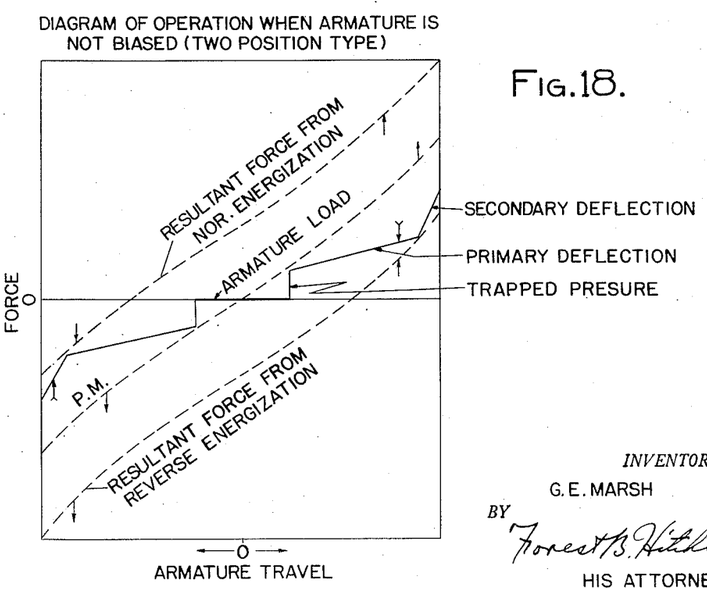
Fig. 18 is a diagram of the operation of the relay of the present invention when its armature is not biased to either position and is associated with the two-step type of contact deflection.

Referring to Fig. 18, it will be noted that the zero point of the armature travel is considered half way between the two extreme operated positions of the armature. This is the position illustrated in Figs. 1, 2 and 3, and is the position which the armature would assume if the permanent magnet were not present and only the spring 28 was to be taken into account. As previously mentioned, the permanent magnet flux cannot be perfectly balanced in practice even though the mechanical balance is adjusted to a center position. For this reason, the permanent magnet flux is effective to cause the armature to move from such center position toward that core member carrying the greater portion of such permanent magnet flux. In Fig. 18 the direction of the force or pull of the permanent magnet flux has been indicated by small arrows, and it is noted that these are in opposite directions on opposite sides of the zero point of the armature travel. Once the permanent magnet flux causes the armature to move, the flux continues to build up so that the armature continues its movement, and the permanent magnet flux is of such a value that it is capable of overcoming the trapped pressure, the primary deflection forces of the contacts and also the secondary deflection forces of the contacts. This can be seen from Fig. 18 inasmuch as the permanent magnet flux provides a force greater than the armature contact load line for the particular direction toward which the armature is being moved. The arrows associated with the armature load line indicate the direction of the opposing force of the contact pressure for the corresponding direction of armature travel.

When the armature is in a fully operated position and the permanent magnet is holding the contacts in their fully deflected positions, the energization of the windings of the relay with the opposite polarity, as above explained, causes the resultant flux in the core then holding the armature to be reduced below a value which will hold the armature in that position, so that the armature begins to move towards its center position. As it does so, the resultant force shifts to the other core to actually change the direction of the force on the armature so that it is quickly moved to its other operated position. It will be noted that in such other operated position the resultant force from the permanent magnet flux and the electromagnet flux is additive and causes the armature to be moved to the new position with considerable force. However, when the windings are deenergized, the permanent magnet flux still provides a force greater than required to hold the contacts and armature in their operated positions. This is explained in detail to give a clearer understanding of the operation of the relay when it is used as a relay of the two-position type.

Figure 8:
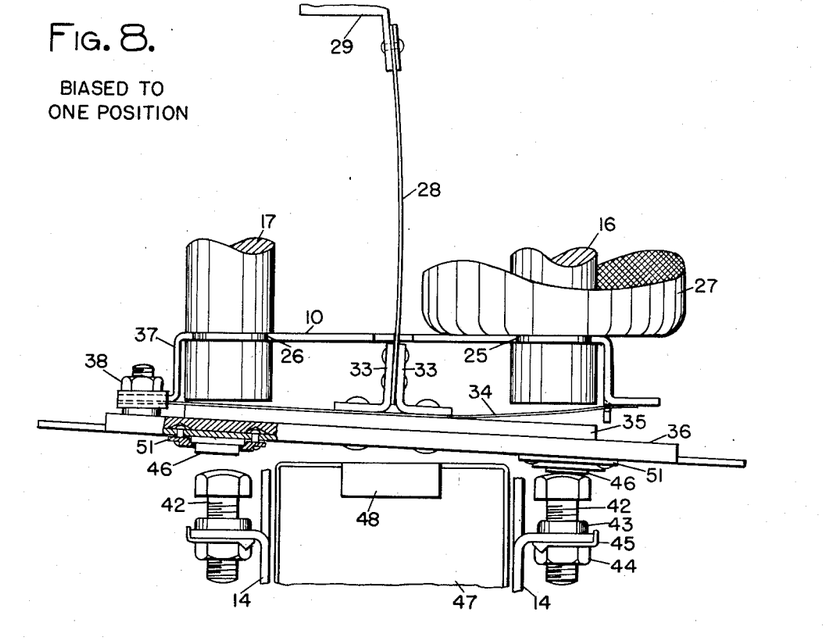
Fig. 8 is a front enlarged view of the armature mounting and back stop structure contemplated in the form of relay shown in Figs. 1, 2 and 3; but with a modified set of the mounting for the armature support spring to give a relay of the "biased to one position" type.

On the other hand, the relay structure of Figs. 1, 2 and 3 may be adjusted to operate as a biased to one-position polarized relay. This is illustrated in Fig. 8 where the bracket member 29 is bent to give the spring 28 such a distortion as to bias the armature 35 in a clockwise direction as shown in Fig. 8. In this form of the relay, it is preferable to provide only a single winding 27, since the relay is more efficient in its operation with this single coil or winding. The operation of the relay with this modification of the structure will be discussed in greater detail hereinafter.

Regardless of the particular adjustment of the structure to give the desired type of relay operation, the pivoting of the armature remains the same. This detail operation of the supporting springs for the armature will now be considered with more particular reference to Fig. 8 where the armature and springs have been enlarged to more readily illustrate the structure.

Referring to Fig. 8, it will be seen that the armature 35 and its connected contact carrier 36 are in a biased position. When in this position, it will be noted that the left-hand side of the spring 34 is substantially parallel with the armature 35. The armature 35 does not make an impact with the spring 34 because the backstop 42 on the right-hand side takes the impact. It will also be observed that the spring 28 is only slightly bowed when the armature is in such position. The right-hand side of spring 34 then assumes its maximum deflection. It should now be apparent that when the armature 35 is actuated to its opposite counter-clockwise position, it will be practically parallel with and practically touching the right-hand side of the spring 34. The left-hand backstop screw 42 of course receives the impact upon the movement of the armature to such opposite position. When the armature 35 is in this operated position, the spring 28 is of course bowed in a direction opposite to that shown.

Considering the above description and the illustration of Fig. 8, it will be apparent that the actual pivot point for the armature is located at substantially where the center line of the spring 28 crosses the center line of the spring 34. This pivot point is maintained in its position so far as practical purposes are concerned to the same degree that the usual pinion and bushing maintain the axis of rotation, and will do so without change for the life of the mechanism. Theoretically, this pivot point moves slightly due to the bowing or flexing of the spring 28. The extent to which the length of the spring 28 is varied by such bowing action is of no practical consequence since a typical structure of this kind has been found to change its length only to the extent of less than one thousandth of an inch.

Since the armature 35 moves about its pivot point and falls in line with the spring 34 for each of its positions, this pivot point is maintained. The spring 34 actually does not change its length, and its right-hand end could as well be permanently anchored the same as its left-hand end. The reason for using the type of holding means shown, is for providing a simple assembly with reasonable manufacturing tolerances and reducing the number of parts. Theoretically, a slight flexing of the spring 34 occurs and for this reason the actual pivot moves as much as one-half thousandths of an inch in a typical structure of this kind and will not change since there is no wear. These values are mentioned in connection with a typical relay merely to more definitely indicate the practical effectiveness of applicant's structure as compared to conventional trunnions.

Referring to Figs. 2 and 3, it will be noted that the armature 35 has been shown in a mid-stroke position for convenience in the disclosure. In this position, the spring 34 has a bow or deflection equal on both sides, and this might be termed the normal or absolute pivot point of the armature. Any theoretically possible movement of the pivot point from this initial position is the same for each operated position; and since it is the operated positions which determine the contact operation and pressures, the effect of any slight movement in the normal pivot point is wholly negligible. This structure of the armature support or pivot is the same for all forms of the invention and thus will not be discussed in detail for each form.

In order to provide the armature 35 with a normal bias in a clockwise direction in the form shown in Fig. 8, the bracket member 29 is bent or displaced just sufficiently to cause the spring 28 to deflect the armature slightly away from its mid-stroke position shown in Fig. 2 in a clockwise direction so as to reduce the air gap between the armature 35 and the face of the core member 17. In other words, the normal bias of the armature 35 is in part produced by the deflection of spring 28. The remainder of the bias on the armature 35 is produced by the permanent magnet 47.

Referring to Fig. 9, it will be observed that the permanent magnet 47 causes magnetic flux to pass into the armature 35 and then divide into two paths including cores 16 and 17 respectively. These two paths then join in the backstrap 20 and core block 12 to pass through the frame support 6 to the south pole S of the permanent magnet 47. If the armature were exactly in a centered position and the parts were exactly the same in every respect so that the flux through these two cores 16 and 17 were identical (which is not possible in practice), the armature 35 would remain in its mid-stroke position. But since the slight deflection of spring 28 causes the armature 35 to assume a position with the smallest air gap adjacent the face of the pole piece 17, then the major portion of the flux from the permanent magnet will divide and flow through the pole piece 17. The increase flux in the air gap between this core member and the armature 35 causes an added pull which moves the armature 35 to its biased position shown in Fig. 8. This further reduction of the air gap of course increases the biasing flux from the permanent magnet and thus gives the operating force required to deflect the contacts when in this biased position.

The flux from the permanent magnet normally present has been shown by solid lines in the diagrammatic illustration of Fig. 9. As above mentioned, the biased to one position form of relay of Fig. 8 contemplates the most efficient operation of the relay when an operating winding 27 is alone used on the core 16. The flux produced by the energization of this single winding 27 is shown by dotted line arrows. It will be noted that this is a local path including the core 16, the backstrap 20 and the core block 12, the core member 17 and the armature 35. This local magnetic path excludes the permanent magnet 47. The direction of the magnetomotive force in this local magnetic path is of the same polarity as the permanent magnet flux in core 16 and is of the opposite polarity in core 17. The direction of the magnetomotive force thus produced in the core 16 is of the same polarity to the flux which is produced by the permanent magnet. For this reason, the armature is moved to an operated position both by the increased flux passing through the air gap between the pole face of core 16 and the armature 35 and because of the decrease in flux passing between the pole face of core 17 and the armature 35.

Even though this most efficient operation is obtained by a single winding on core 16 it should be understood that a wholly practical and operative arrangement is provided when coils or windings are placed on both cores and connected either in multiple or in series and energized with the proper operating polarity.

The relay, as described above in connection with the form of Fig. 8, is responsive to operate its contacts only when the winding or windings are energized with a particular polarity. When the windings are energized with the opposite polarity, the armature 35 is merely more strongly held in its biased position. This can be seen by reference to Fig. 9 and assuming that the winding 27 is energized to produce a magnetic flux in the opposite direction to the dotted line arrows shown. Such a flux would in the core member 16 oppose the permanent magnet flux indicated by the solid line arrow and thus further reduce the magnetic flux passing through the air gap between the face of the core member 16 and the armature 35. In the core member 17, the direction of any flux from the coil 27, or an additional coil on core 17, would be in such a direction as to be additive with the flux from the permanent magnet and thus increase the pull on the armature 35 towards its biased position. For these reasons, the energization of the winding 27 with such polarity does not cause the operation of the armature 35.

This form of the invention discussed in connection with Fig. 8, of course, assumes that the remainder of the relay structure is the same as shown in Figs. 1, 2 and 3 with contacts connected to the armature in the same way. The operation of the relay when thus constructed has been diagrammatically illustrated in Fig. 17. The two-step type of contact is assumed as being the armature load line 251 with the permanent magnet being represented by the line 250. It is thus seen that the permanent magnet provides considerably more pull to hold the contacts in a biased position than the actual load on the armature. Thus, the contacts are firmly held in their biased positions.

Figure 17:
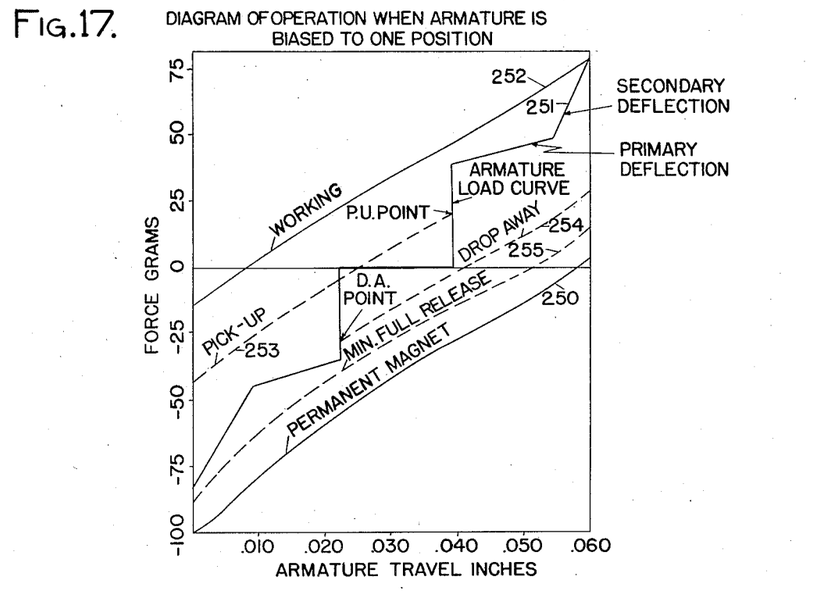
Fig. 17 is a diagram of the operation of the relay of the present invention when its armature is biased to one position and is associated with the two-step type of contact deflection.

When the coil or winding 27 is energized to a working value, the resultant force on the armature is represented by line 252. Since this is considerably less than the armature load, the armature begins to move towards its center position and as it does so the working force changes direction as the line 252 crosses the zero point and then begins to positively operate the armature to its operated position. The manner in which the two-step contact deflection structure operates to prevent the contact bounce is apparent from the structure itself. Also, this Fig. 17 illustrates that the contact load on the armature as represented by line 251 closely follows the actual force on the armature and for this reason tends to prevent armature bounce. The amount of energy in the winding to just effect the pick up of the armature is represented by the dotted line 253; while the amount of energy in the winding permitting just the dropping away of the armature is represented by the dotted line 254. The line 255 represents that force which may be permitted during a minimum energization of the windings and still effect the full release of the armature to its reverse position. As above mentioned, this operation is substantially the same as described in my prior Patent No. 2,731,527, issued January 17, 1956, and for this reason, will not be discussed in greater detail. However, it will be seen that the contact structure is considerably different than disclosed in such prior application and is particularly adaptable to a relay of this type.

Referring to Fig. 9 and taking a general view of the magnetic structure, it will be observed that the permanent magnet provides a flux which is divisible in two paths through the armature, its operating air gaps and two cooperating cores 16 and 17; whereas the magnetic paths for flux produced by the operating windings, either a single winding 27 on core 16 or a two winding arrangement also including one on core 17, has only a single magnetic path and when flux is caused to flow in one direction in this path it is additive with respect to the permanent magnet flux in one core and is in opposition to the permanent magnet flux in the other core. When the magnetic flux due to the energization of the windings is reversed, these conditions are merely caused to exist in the opposite core members. It will also be observed that the magnetic flux which flows in the magnetic paths for the energizing windings included both air gaps between the armature and the core members, but excludes the magnetic paths including the permanent magnet. This arrangement of magnetic structure thus prevents the operating magnetic fluxes from interfering with the permanent magnet to deteriorate its strength.

*Modified form*

One of the features of the present invention is to provide a relay structure which is adaptable to be provided with either one or two contact operating armatures. When two operating armatures are employed, one armature is made responsive to a particular polarity, and the other armature is made responsive to the opposite polarity. In this way, the relay is responsive to either polarity selectively, and the structure can take the place of two separate relay structures of the usual polar biased type. This modified form of the invention has been shown in Figs. 10, 11, 12, 13, 14, 15 and 16.

Figure 10:
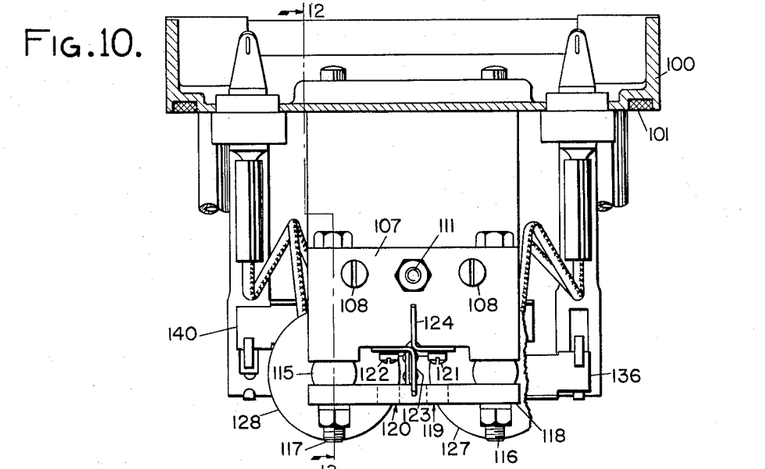
Fig. 10 is a top view of a modified form of a relay structure embodying the present invention and having two independently operable armatures.

Referring to Fig. 10, it will be seen that the relay of the present invention is provided with a back plate or base 100 which has a flat portion to which the various parts of the relay are attached. This base 100 may either be of metal or of molded insulating material. In either case, it is provided with a continuous upraised edge at the back to give rigidity to such base plate 100 and to enclose the plug coupling connectors when the relay is mounted against a plugboard.

Figure 12:
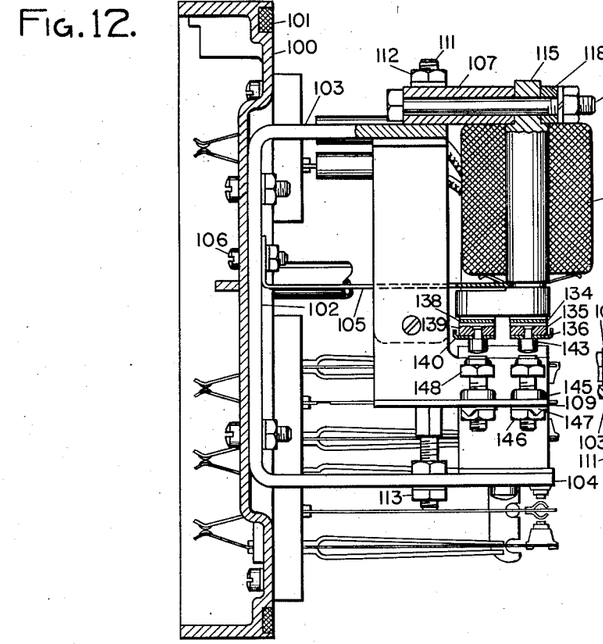
Fig. 12 is a side view of the relay shown in Figs. 10 and 11 with parts shown in section to more clearly illustrate the structure.

In Fig. 12, it will be noted that the base plate 100 has a groove around its outside edge which is filled with a suitable gasket 101 of sulphur-free rubber against which the cover for the relay may press to tightly enclose the relay operating parts.

To the base plate 100 is mounted a supporting bracket 102 which is attached to the base plate by bolts at several different points (see Fig. 12). The shape of this support bracket 102 can best be seen in Fig. 13, where the isometric view clearly indicates that this support bracket has two outwardly turned ends 103 and 104. Between these two outwardly turned ends 103 and 104 is an intermediate bracket 105 which is attached to the support bracket 100 by bolts 106 (see Fig. 12). Connected to the extending portion 103 of the support bracket 102 is a core block 107 which is held in place by bolts 108 (see Fig. 10). These bolts also hold in position two downwardly and oppositely disposed brackets 109 and 110. It will also be noted that a stabilizing bolt 111 passes through the core block 107 and extending portion 103 of the bracket and connects to the extending portion 104. For convenience this stabilizing bolt 111 has a central portion which is made either square or six sided in order to be readily held by a conventional wrench. In addition, each end is threaded, with the upper end having nut 112 and the lower end having nut 113 so that the extending portions 103 and 104 of the support bracket 102 are rigidly held in their spaced relationships after adjustment of the air gap between the permanent magnet and the armatures.

The core block 107 has two downwardly extending core members 114 and 115 which are connected to the core block by bolts 116 and 117 which also pass through the backstrap 118. This backstrap 118 also has holes 119 and 120 to allow access to the stud bolts 121 and 122 which fasten the armature support brackets 123 and 124 in position. The reasons for this will be described later. The downwardly extending cores 114 and 115 have slots 125 and 126 around their periphery which receive the intermediate bracket 105 as best seen in Fig. 12. This provides stability for the ends of the cores and also adds a rigid holding effect on the intermediate bracket 105 since its thickness is proper to just fit into these slots 125 and 126 with a mild press fit.

In this form of the invention, it is necessary to have two energizing windings 127 and 128 to obtain the most practical and symmetrical operating characteristics.

Figure 11:
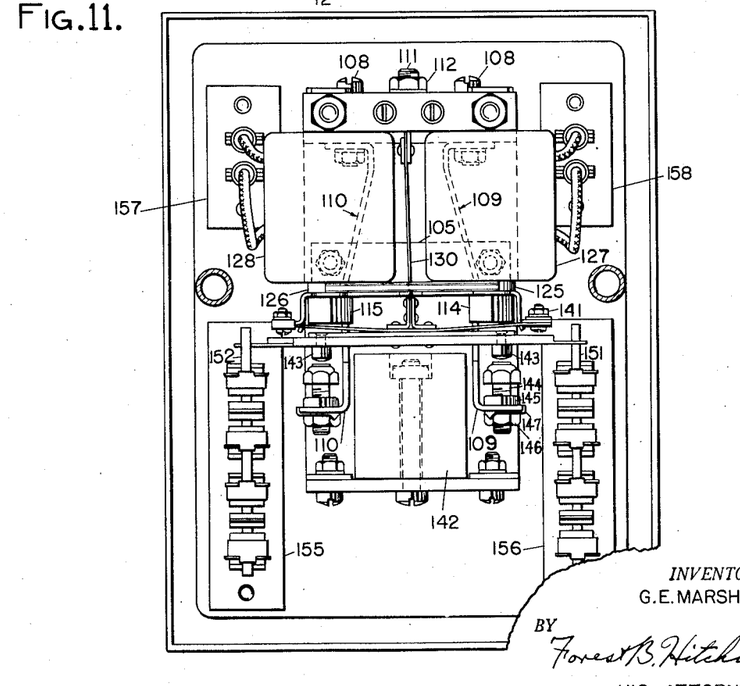
Fig. 11 is a front view of the relay shown in Fig. 10.

Referring to Fig. 11, it will be noted that the two brackets 123 and 124 are turned in opposite directions and attached to each of these brackets is a support spring for the respective armature to which it relates. These two armature supported springs 130 and 131 can best be seen in Fig. 14; and these springs extend downwardly to their respective armatures 135 and 139. A side enlarged view of the mounting of the springs 130 and 131 to their respective brackets 123 and 124 is shown in Fig. 15. This view of Fig. 15 is a side cross sectional view of the mounting portion looking from the left towards the brackets 123 and 124 of Fig. 10. This view shows how the springs 130 and 131 are riveted to their respective brackets 123 and 124.

Just to the back of the armature mountings, the bolt 111 is shown extending between the upper portion 103 and the lower portion 104 of the mounting bracket 102. The manner in which this bolt is connected to the block 107 can also be seen in Fig. 15.

Figure 14:
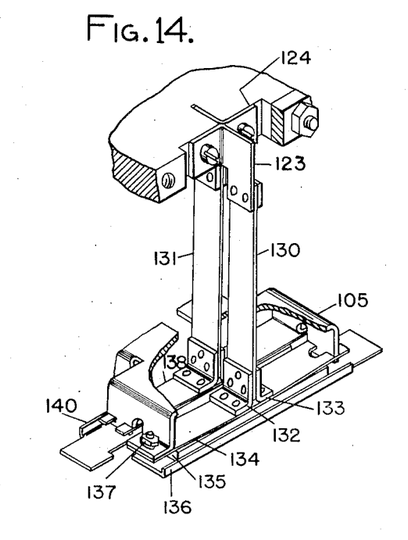
Fig. 14 is an isometric view of the armature spring mounting in the form of the relay shown in Figs. 10, 11 and 12.
Figure 15:
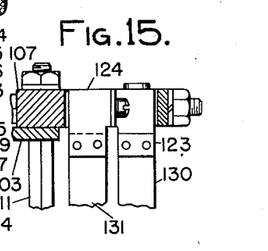
Fig. 15 is an enlargement and sectional portion of the relay shown in Fig. 12 to give another view of one portion of the armature support and mounting.

Referring to Fig. 14, it will be seen that the spring 130, for example, is connected by two brackets 132 and 133 to the cross spring 134 and armature 135 and contact operator 136 by suitable rivets. The cross spring 134 is fastened at its left-hand end by the bolt 137 to prevent lateral movement of the armature mounting, but its other end is held by the slotted extensions of bracket 105 which bracket is supported against bracket 102 as explained in connection with Fig. 12. The structure of this armature support is exactly the same as discussed in connection with the main form of the invention previously described.

In addition, the armature support spring 131 is connected by suitable brackets to its spring 138, armature 139 and contact operator 140. The only difference between this armature 139 and the armature 135 is that its horizontal spring preventing lateral movement is permanently fastened by bolt 141 (see Fig. 11) while its left-hand end is held by the slots in the bracket 105. The front armature 135 is biased by the joint action of its support spring 130 and the cooperating permanent magnet 142 in a clockwise direction in the same way as discussed with the single armature form shown in Fig. 8, whereas, the other armature 139 is biased in a counter clockwise direction by the joint action of its spring 131 and the cooperation of the permanent magnet 142. In both cases, the armatures thus biased are held in their operated positions by the magnetic pull of the permanent magnet in the same way as previously discussed. However, it should be noted that in this instance the armature 135 operates the contacts at the right-hand side of the relay as shown in Fig. 11 while the armature 139 operates the contacts at the left-hand side of the relay as shown in Fig. 11.

It is noted that in this form, both armatures are provided with a structure of backstops which is different than shown in Figs. 1, 2 and 3. Either form may be used as desired. Each armature has two backstop buttons 143 connected through the armature and the contact operator member by a reduced pin portion riveted to support 139 (see Fig. 12). These buttons 143 are preferably made of stainless steel and have rounded or oval surfaces which are highly polished (see Fig. 16). These backstop buttons 143 cooperate with backstops which are mounted on the outwardly turned edges of brackets 109 and 110. These brackets, of course, extend downwardly as previously described, and are fastened by suitable bolts to the bracket 105, as shown in detail for the main form of the invention with respect to brackets 10 and 14 in Fig. 8. The backstop bolt 144 is screwed into the outward extending portion of bracket 109 which has an added threaded button 145 permanently attached thereto. Also, a lock nut 146 and a lock washer 147 are provided.

Figure 16:
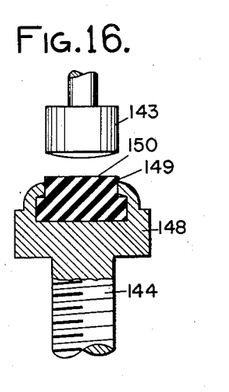
Fig. 16 is an enlarged sectional view of one of the back stops employed in the relay structure of Fig. 12.

At the upper portion of the backstop bolt 144 is an enlarged head 148 which can be best seen in Fig. 16. This enlarged head has a hollow portion in which a piece of phenolic plate 149, is positioned having an enlarged base so that the edges of the button 148 can be turned or spun in tightly around the insulating piece. This insulating or contacting backstop portion 149 is cut out of a flat piece of phenolic plate, Formica or the like with the smooth molded surface of such piece being at the top or outer surface which will be struck by the stop pin. The thickness is so chosen that only a very slight portion of the rough or cut edges of the button 149 are outside of the cup formed within the button 148. The top surface 150 is the smooth glazed surface of the material as it comes from the molds. This surface must be wholly without abrasions. For this reason, the buttons 149 must be carefully selected during manufacture and all such having abrasions on the surface 150 must be discarded. It has been found that the operation of a relay with such a backstop 143 of stainless steel against the glazed surface of Formica, phenolic plate or the like will operate indefinitely without wear.

It should be noted that the reason for mounting the button 149 within the cup-shaped metal end 148 is so as to tightly enclose its cut surfaces to prevent the absorption of the moisture during changing atmospheric conditions. In this Fig. 16, the parts have been enlarged so that it appears that the button 149 extends out of its cup, but in practice this is only a few thousandths of an inch, merely enough to ensure that the surface 150 is above the outer-most portions of the metal cup. Button 149 is much thicker than button 46 of Fig. 2.

Referring to Fig. 10, it can be seen that the contact operator 136 extends to the right while the contact operator 140 extends to the left. These respective extensions 136 and 140 operate their respective contact pushers 151 and 152 the same as described in connection with the main form of the relay shown in Figs. 1, 2 and 3. However, the contacts in this instance are illustrated as being of the carbon type for the front and back points with the movable contact fingers being of suitable contact metal. Actually, any contact material such as silver, paladium, or tungsten can be used. The respective contact fingers extend through their insulated blocks to make contact with conventional plug coupling structure.

Referring to Figs. 11 and 12 it can be seen that the contact blocks 155 and 156 are attached to the base plate 100 which has openings for the plug coupling extensions of the contact fingers. These contact fingers are molded into these blocks 155 and 156, the same as described in connection with Figs. 1, 2 and 3.

However, in this form of the invention it is desirable, as above mentioned, to have two windings 127 and 128. These windings may be connected in series, in multiple, or may be energized independently under certain circumstances, and for this reason, the added insulated blocks 157 and 158 are provided to hold the stub terminals to which the leads from the windings 128 and 127 respectively can be connected. The extensions to the stub contacts in these blocks also extend through an opening in the base plate 100 as can be seen in Fig. 10.

It is to be understood that the contacts in this form of the invention have the same two-step deflection features as described in connection with Figs. 1, 2 and 3, and that their cooperation with their respective armatures is the same as described in connection with Fig. 17. In other words, since each of the armatures 135 and 139 is of the biased to one position type, they have the same characteristics that the form of the invention has as disclosed in connection with Fig. 8 and described in connection with Fig. 17. For this reason, detailed explanation will not be repeated.

Figure 13:
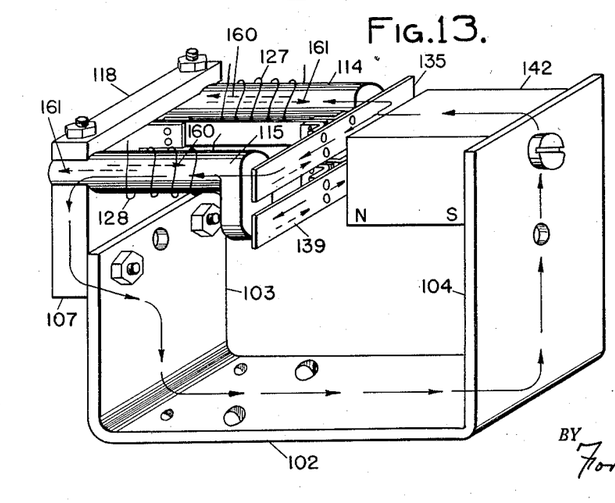
Fig. 13 is an isometric diagrammatic view of the relay shown in Figs. 10, 11 and 12 to illustrate the magnetic flux paths and the operation of the relay having two independently operable armatures.

Referring to Fig. 13, and remembering that the armature 135 is biased in a clockwise direction while the armature 139 is biased in a counter clockwise direction, it will be noted that the various flux paths have been shown by arrows. The solid arrows indicate the magnetic flux from the permanent magnet, and there are solid arrows from the permanent magnet through the armature 135 and the core member 115 through the core block 107 and the mounting bracket portions 103, 102 and 104 back to the permanent magnet. This magnetic flux through the armature acts in conjunction with the armature spring 130 to bias the armature 135 against the pole face of the core 115. On the other hand, the spring 131 has its bias so as to move the armature 139 beyond its center position in a counter clockwise direction. Thus, the permanent magnetic flux passes from the permanent magnet through the armature 139 and the pole face extension of core 114, through the core block 107 and bracket portions 103, 102 and 104 back to the permanent magnet. This gives a bias to the armature 139 in a counter clockwise direction. In both cases, the operating pull or force for the associated armature is supplied by the magnetic flux from the permanent magnet.

When the windings 127 and 128 are energized with current in a particular direction to produce magnetic flux as shown by the dotted arrows 160, the permanent magnet flux is added to in core 114 and is reduced in core 115. This makes it so that the armature 135 is operated in a counter clockwise direction against its bias. Insofar as the armature 139 is concerned, it is already biased in a counter clockwise direction so that any added magnetic flux through the core 114 merely holds it in its biased position more firmly.

On the other hand, when the windings 127 and 128 are energized with current in the opposite direction, the magnetic flux indicated by arrows 161 is produced through the cores 114 and 115. This flux adds to the permanent magnet flux in core 115 but opposes the permanent magnet flux in core 114. In this case, the flux is sufficient in core 115 to attract the armature 139 and operate it in a clockwise direction; but the other armature 135 already being biased in a clockwise direction is only the more firmly held against the pole face of core 115.

In this way, the relay is made selective in the operation of its two armatures, i. e. the energization of the windings with one polarity operates one armature and the energization of the windings with the other polarity operates the other armature. The deenergization of the windings allows both armatures to assume their respective biased positions.

In the above discussion, it has been considered that this form of the invention has the two windings 127 and 128 connected in series with the armatures 135 and 139 selectively responding to their respective polarities. However, it should be further pointed out that this relay can be operated in two separate circuits with the coil 127 being connected in one circuit and operating its armature 135 and its associated contacts, and with the coil 128 being connected in another circuit and operating its armature 139 and associated contacts. In this case each armature is operated as described in connection with Fig. 8 for a single armature relay with only one coil. In other words, each armature will respond only to the energization of its operating coil with a particular polarity. But it should be noted that such energizations for the two coils must occur at separate times, because if both are energized at the same time, then the result is that neither armature responds. In this way, coincidence of energizations can be detected by the relay of this invention.

Summary

From the above description and consideration of the drawings, it will be clear that the core and armature magnetic path is a local one including the backstrap connecting the cores at their ends opposite from the armature. The permanent magnet is included in a principal magnetic circuit which provides a flux that passes through the two cores in parallel and in common with the local armature and core path. The greater portion of the permanent magnet flux passes through that core which has the armature adjacent its pole face. When the winding or windings on the cores are energized with one polarity or the other, this greater portion of permanent magnet flux is merely caused to pass through one core or the other depending upon the polarity of energization. The electromagnetic force set up in the local core-armature path consequent to the energization of the windings, merely reduces the net flux in one core and increases the net flux in the other core without producing a net electromotive force in the principal magnetic circuit in direct opposition to the permanent magnet. In other words, the total flux through the permanent magnet is not reduced by the energization of the windings. For this reason, no deterioration of the permanent magnet is encountered.

An additional feature of this structure resides in the fact that the armature may be operated to its opposite positions in response to opposite polarities of energization of its windings without causing a reversal in the armature flux. In other words, the flux in the armature does not have to pass through zero and effect a reversal of the residual flux in the armature iron. This is because the electromagnetic force produced in the local core-armature path which effects a reduction in the net flux in one of the cores does not have to reduce such net flux to or beyond zero to allow the operation of the relay. Thus, even in the core having a minimum of flux for a given operating condition there may be a residual of flux of the same polarity as that previously existing. For this reason, the residual flux of the magnetic structure does not cause instability or irregularity in the operation of the relay as may be found in some relays of the prior art.

Another characteristic of the structure embodying the present invention is that the location of the mounting springs, such as 28 and 34 of Fig. 8, act as a safety factor in the event the backstop screws 42 should actually become loosened due to vibration or accidental causes. In other words, the adjustment of the backstop screws 42 determines the amount of armature movement and stops the armature short of making an impact on the support spring 34, as previously described; but in the event that the backstops 42 are not properly effective, then the armature 35 is prevented from actually contacting the faces of the cores 16 and 17 by reason of the presence of the nonmagnetic spring 34. This of course prevents any sticking of the armature due to residual magnetism or the like, and is applicable to all forms of the invention. This may be termed a fail safe feature which is particularly desirable in relays employed in railway signalling or other systems where a high degree of safety is involved.

In this connection, it should be observed that two forms of backstop have been shown and described, either of which may be used in any form of the relay. Both forms employ the same principle of using a stainless steel as making impact against a phenolic plate.

As above mentioned, the "biased-to-one-position" type of relay structure described more particularly in connection with Fig. 8 may advantageously be operated by the use of only a single coil or winding 27 energized with the same number of ampere-turns as when two coils are used. This is because for certain uses it is desirable to have the dropping away current level of the relay as high a percentage of the operating current level as possible. When only a single winding is used, the adjustment of the relay with respect to the operating current and the permanent magnet strength can be such that the permanent magnet is less effective when the armature is in an operated position away from its biased position and the single winding on the core adjacent the operated position of the armature is more effective in producing a working force on the armature in the operated position. Assuming that the single winding has the same number of ampere-turns for an operating value as would a two coil arrangement, then the change of working forces becomes greater as the armature approaches its fully operated position, and for this reason the effective operating force of the permanent magnet for such position must be reduced. This provides that the drop away value of current in the single winding may be of a higher value than the two coil arrangement because the permanent magnet is not required to supply a positive operating force on the armature for the operation of the contacts. In this way, the dropping away current value then becomes a higher percentage of the operating current value. This is pointed out as being applicable to the forms of the relay described in connection with Figs. 8, 10, 11 and 12. In connection with the form of relay shown in Figs. 10, 11 and 12 where two armatures are employed, each of the two armatures may be considered as operated by its own coil individually.

It will now be apparent that the relay of the present invention has various structural characteristics which adapt it to many different uses, and which render the relay both efficient and safe for protracted periods of operation. It should also be understood that the magnetic structure of the relay can be employed to operate an armature and associated contacts even though the pivotal support arrangement for the armature takes a different form such as conventional trunnion bearings. Also, the converse is true, namely, the pivotal support structure disclosed herein can be employed in relays having different magnetic structural features. Another feature disclosed herein is the backstop arrangement which obviously as a subcombination can also be used in different relay structures.

Having described several forms of a relay embodying the principles of the present invention, it is to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In an electromagnetic relay, two spaced core members, a flat armature having a suitable length for cooperating with and extending between said two core members, a mounting for said armature comprising a lateral flat spring substantially the same length as said armature and lying along its inside surface and fastened near its longitudinal center to said armature near its longitudinal center, holding means for supporting the outer ends of said lateral spring slightly away from said armature to produce a predetermined arc with at least one of said holding means permanently anchoring the corresponding end of said lateral spring, another flat spring located at substantially right angles to said flat surface of said armature and fastened thereto near the longitudinal center of said armature, and means for anchoring the outer end of said another spring, whereby said armature is movable about a pivot point formed solely by said springs jointly at substantially the longitudinal center of said armature in response to the application of magnetomotive forces to said core members.

2. In an electromagnetic relay, two parallel cores connected at one end by a core block and having a cooperating armature at the other end, a fixed pivotal support for said armature at a point intermediate of its length, a bias spring acting on said armature and tending to cause one end of said armaure to move closer to its core than the other end is to its core, a permanent magnet having one pole adjacent the pivotal support of said armature, a magnetic frame structure connecting the other pole of said permanent magnet with said core block, whereby the flux from said permanent magnet divides unequally between said cores and causes said armature to be moved to a particular position, and windings on said cores energizable with either polarity, the energization of said windings with one polarity merely acting to hold said armature in said particular position, but the energization of said winding with the opposite polarity causing said permanent magnet flux to divide unequally between said cores in the opposite relationship to thereby operate said armature to its other position.

3. In an electromagnetic relay, two parallel cores, a backstrap connection between one pair of adjacent ends of said cores, a cooperating armature extending across the other pair of adjacet ends of said cores, a frictionless pivotal support for said armature at a mid point of its length comprising, a first leaf spring extending along one side of said armature between it and said cores, said spring being attached to said armature at a point intermediate to its two ends, holding means for each outer end of said spring causing said spring to be bowed slightly away from said armature towards said cores, a second leaf spring between said two cores and parallel thereto and fastened at one end to said armature at the same point as said first leaf spring is fastened, means for anchoring the other end of said second spring, whereby the armature is suspended solely by its connection at the junction point of said first and said second leaf springs, a permanent magnet adjacent said armature with one of its poles near said pivotal support, a frame member of magnetic material supporting said permanent magnet adjacent its other pole and extending to said backstrap, and a winding on at least one of said cores.

4. In an electromagnetic relay, two parallel cores, a backstrap connection between one pair of adjacent ends of said cores, a cooperating armature extending across the other pair of adjacent ends of said cores, a pivotal support for said armature at a midpoint of its length comprising, a first leaf spring extending along one side of said armature between it and said cores and beyond the ends of said armature, said spring being attached to said armature at a point intermediate to its two ends, holding means for each outer end of said spring causing said spring to be bowed slightly away from said armature towards said cores, at least one of said holding means acting as an anchor for its end of said spring, a second leaf spring located between said two cores and parallel thereto and fastened to said armature at the same point as said lateral spring is fastened, means for anchoring the other end of said second leaf spring with a position causing a slight deflection of said second spring to partially rotate said armature toward a particular position, said pivotal support being effective solely by the longitudinal rigidity of the leaf springs to maintain a substantially fixed pivot of the associated armature, a permanent magnet adjacent said armature with one of its poles near said pivotal support, a frame member of magnetic material supporting said permanent magnet adjacent its other pole and extending to said backstrap, whereby the permanent magnet flux divides unequally between said cores and causes said armature to be moved to said particular position, contacts operatively connected to said armature and operated thereby to either of two positions, windings on said cores, the energization of said windings with one polarity merely acting to hold said armature in said particular position, but the energization of said windings with the opposite polarity causing said permanent magnet flux to divide unequally between said cores in the opposite relationship to thereby operate said armature to its other position against the bias force of said second spring which bias force is of sufficient magnitude to move said armature past its center position when said winding is deenergized and thereby allow said permanent magnet flux to fully operate said armature to said particular position.

5. In an electromagnetic relay, two parallel cores connected at one end by a core block and having two cooperating armatures at the other end, a pivotal support for each of said armatures at a point intermediate of the length of that armature, a bias spring acting on each armature tending to cause that armature to move beyond center toward a particular one of said cores, such bias springs acting in opposite directions for said respective two armatures, a permanent magnet having one pole adjacent the pivotal supports of both said armatures, a magnetic frame structure connecting the other pole of said permanent magnet with said core block, whereby the flux from said permanent magnet with respect to each armature divides unequally with respect to the associated cores to thereby cause each armature to be moved to that particular position toward which it is spring biased, and windings on said cores energizable with either polarity, the energization of said windings with one polarity causing the operation of one armature to its opposite position but merely acting to hold the other armature in its particular biased position, but the energization of said windings with the opposite polarity causing said other armature to be operated to its opposite position but merely acting to hold said one armature in its said particular position, whereby said two armatures are respectively responsive to opposite polarities of energization.

6. In an electromagnetic relay; two parallel cores; a backstrap connection between one pair of adjacent ends of said cores; two cooperating armatures extending across the other pair of adjacent ends of said cores; a pivotal support for each of said armatures at a mid point of its length comprising a first leaf spring extending along one side of said armature between it and said core, said spring being attached to said armature at a point intermediate to its two ends, holding means for each outer end of said spring causing said spring to be bowed slightly away from its armature toward said cores, and at least one of said holding means acting as an anchor for its end of said spring, a second leaf spring located between said two cores and parallel thereto and fastened to said armature at the same point as its associated first leaf spring is fastened, means for anchoring the other end of said second leaf spring with a position causing a slight deflection of said second spring to partially rotate said associated armature, a permanent magnet adjacent said armatures with one of its poles near their pivotal supports, a frame member of magnetic material extending from the other pole of said permanent magnet to said backstrap, whereby the permanent magnet flux cooperates with the initial spring bias for said two armatures to respectively bias said armatures to opposite positions, windings on both said cores, the energization of said windings of one polarity causing one of said armatures to be actuated to an operated position, and the energization of said windings with the opposite polarity causing the other of said two armatures to be actuated to an operated position, whereby said two armatures are respectively responsive to opposite polarities of energization in said windings.

7. In an electromagnetic relay, two cores with two cooperating armatures pivoted between one pair of ends of said cores, a core block connecting the other pair of ends of said cores, spring biasing means for acting on said armatures to respectively bias said armatures toward opposite positions, a permanent magnet having one pole adjacent the pivot points of said two armatures, a magnetic frame structure connecting the other pole of said permanent magnet with said core block, and windings on each of said two cores energizable for individually operating said two armatures.

8. In an electromagnetic relay, two parallel cores magnetically connected at their backs, a cooperating armature extending across the faces of said two cores, a pivotal support for said armature at a mid point of its length comprising, a first leaf spring extending along one side of said armature between it and said core, said spring being attached to said armature at a point intermediate to its two ends, holding means for each outer end of said spring causing said spring to be bowed slightly away from said armature and closely adjacent to the faces of said cores, a second leaf spring located between said two cores and parallel thereto with one end fastened to said armature at the same point as said first leaf spring, means for anchoring the other end of said second spring, a permanent magnet adjacent said armature with one of its poles near said pivotal support, a frame member of magnetic material supporting said permanent magnet adjacent its other pole and extending to the back of said magnetically connected core members, windings on at least one of said cores, phenolic buttons fastened to said armature on opposite sides of its pivotal support, cooperating backstop screws of stainless steel adjusted to determine the extent of movement of said armature for each position so that said armature closely approaches but fails to make impact with said first leaf spring in each position, whereby said relay is operable to opposite positions around a pivot point provided solely by two spring members at substantially right angles to each other without bearing the impact of normal operation, and whereby the accidental failure of said backstop screws cannot allow said armature to come into intimate contact with said cores because of the intervening lateral spring.

9. In an electromagnetic relay, a flat armature pivoted to move in a plane perpendicular to the surface of said armature, a phenolic button attached to said armature at each side of said pivot point and wholly enclosed except for its smooth outer surfaces as originally molded, a backstop screw for each of said phenolic buttons and having a rounded head of a radius in the order of one inch, the heads of said backstop screws being of stainless steel.

10. In an electromagnetic relay, a flat armature pivoted to move in a plane perpendicular to the surfaces of said armature, a stainless steel button attached to said armature on opposite sides of its pivot, a backstop member located to cooperate with each of said buttons, said backstop members having a cut portion for enclosing a phenolic button except for its smooth molded outer surface, whereby the operation of said armature to opposite positions causes the armature to be limited in such movement by said backstop members.

11. In an electromagnetic relay, two cores connected at one end by a core block, a cooperating armature at the other ends of said cores, a fixed pivotal support for said armature at a point intermediate of its length, a biasing spring acting on said armature and tending to cause said armature to move in a particular direction so that the ends of said armature are unequal distances away from the ends of their respective cores, contacts operatively connected to said armature and providing a load on said armature in each of its operated positions substantially greater than the biasing force of said biasing spring, a permanent magnet adjacent said armature near its pivotal support and provided with a magnetic connection to the core block, said permanent magnet providing a magnetomotive force which is effective to cause said armature to fully operate said contacts in a direction determined by that end of said armature being closest to its respective core, a winding on only one of said cores, the energization of said winding with one polarity having no operative effect on said armature but the energization of said winding with the opposite polarity causing said armature to operate to an opposite position.

12. In a relay structure, an electromagnet having two spaced core members, an armature extending across said core members and pivoted at its center by means comprising a flat spring located between and substantially parallel to said core members with one end attached adjacent the center of said armature and with its other end permanently anchored, another flat spring of non-magnetic material lying along the inside of said armature and attached thereto adjacent the center with its outside ends extending beyond said armature and anchored in a position to cause a slight inward bowing thereof, whereby said armature pivots about a point and is protected from coming into direct contact with said core members by said another flat spring.

13. In a relay having an electromagnetic structure for actuation of an armature, two laterally disposed longitudinal armatures subject to torsional operation independently about their respective center points by the energization of the electromagnetic structure, and an antifriction bearing for each of the armatures comprising, two leaf springs extending radially in different directions from said center point of said armature, fixed support means for the outer ends of said leaf springs, and means for rigidly securing said leaf springs to the center of said armature, said antifriction bearing being effective solely by the longitudinal rigidity of the leaf springs to maintain a substantially fixed pivot of the associated armatures but yet permit the torsional operation of the armatures due to energization of the electromagnetic structure by reason of the lateral flexure of the leaf springs.

14. In a relay having a U-shaped electromagnetic structure for actuating an armature, a longitudinal armature subject to rotary actuation about its center point by the energization of the electromagnetic structure, a bifurcated support bracket providing two laterally disposed support points, and an antifriction armature bearing comprising, a first leaf spring extending longitudinally along the armature having one of its ends secured to one of said support points and having its other end slidably supported by the other of said support points, a second leaf spring disposed substantially normal to an intermediate point in said first leaf spring, fixed support means for one end of said second leaf spring, and means for joining the other end of said second leaf spring to said center point of said armature and to said intermediate point in said second leaf spring, said antifriction armature bearing being effective solely by the longitudinal rigidity of said first and second leaf springs to maintain a substantially fixed pivot point about which said armature may rotate when attracted by the energization of the electromagnetic structure.

15. In a relay having a U-shaped electromagnetic structure for actuating an armature, a longitudinal armature subject to rotary actuation by energization of the electromagnetic structure, and an antifriction armature bearing comprising, a first leaf spring extending longitudinally along the armature, a second leaf spring disposed substantially normal to said first leaf spring, fixed support means for one end of each of the leaf springs respectively, and means for securing the other end of said second leaf spring to a substantially central area of said armature and of said first leaf spring, whereby the armature is suspended solely by its connection at the junction point of said first and said second leaf springs so as to be rotatable about this point in response to the energization of the electromagnetic structure as permitted by the flexure laterally of both the first and second leaf springs.

16. In a relay having a U-shaped electromagnetic structure for actuating an armature, a longitudinal armature subject to rotary actuation about its center point by the energization of the electromagnetic structure, and an antifriction armature bearing comprising, a first leaf spring extending longitudinally along the armature, a second leaf spring disposed substantially normal to an intermediate point in said first leaf spring, fixed support means for one end of each of the leaf springs respectively, and means for joining the other end of said second leaf spring to said center point of said armature and to said intermediate point of said first leaf spring, said antifriction bearing being effective solely by the longitudinal rigidity of both of said leaf springs to maintain a substantially fixed pivot point about which said armature may rotate when attracted by the energization of the electromagnetic structure.

17. In a relay having a U-shaped polarized electromagnetic structure with laterally spaced pole faces, two laterally disposed longitudinal armatures subject to torsional operation about their respective center points by the energization of the electromagnetic structure, and an antifriction bearing for each of the armatures comprising, two leaf springs extending radially in different directions from said center point of the associated armature, fixed support means for the outer ends of said leaf springs, and means for rigidly securing said leaf springs to the center of said armature, said antifriction bearing associated with each armature providing by reason of lateral spring bias in one of said associated leaf springs a torsional bias for the the associated armature whereby that armature is restored to a position against a predetermined one of said pole faces upon the deenergization of the electromagnetic structure.

References Cited in the file of this patent

UNITED STATES PATENTS

| Number | Name | Date |
|---|---|---|
| 656,796 | Thompson et al. | Aug. 28, 1900 |
| 1,177,988 | Buhl | Apr. 4, 1916 |
| 1,392,234 | Tirill | Sept. 27, 1921 |
| 1,534,753 | Watson | Apr. 21, 1925 |
| 1,606,164 | Garvin | Nov. 9, 1926 |
| 1,852,423 | Leake | Apr. 5, 1932 |
| 2,134,945 | Howe | Nov. 1, 1938 |
| 2,185,603 | Miller | Jan. 2, 1940 |
| 2,375,586 | Romer | May 8, 1945 |
| 2,436,224 | Ogle | Feb. 17, 1948 |
| 2,526,685 | Price | Oct. 24, 1950 |
| 2,677,028 | Cannon et al. | Apr. 27, 1954 |

FOREIGN PATENTS

| Number | Country | Date |
|---|---|---|
| 525,242 | Great Britain | Aug. 23, 1940 |
| 579,729 | France | Aug. 11, 1924 |
| 779,987 | France | Apr. 17, 1935 |